Sept. 28, 1954  C. H. SEAHOLM  2,690,016
MICROMETER AND MICROMETRIC MEASURING INSTRUMENT
Filed May 11, 1950  3 Sheets-Sheet 1

INVENTOR.
CHARLES H. SEAHOLM
BY
ATTORNEY

Sept. 28, 1954  C. H. SEAHOLM  2,690,016
MICROMETER AND MICROMETRIC MEASURING INSTRUMENT
Filed May 11, 1950  3 Sheets-Sheet 2

INVENTOR.
CHARLES H. SEAHOLM
BY
ATTORNEY

Patented Sept. 28, 1954

2,690,016

UNITED STATES PATENT OFFICE 2,690,016

MICROMETER AND MICROMETRIC MEASURING INSTRUMENT

Charles H. Seaholm, New York, N. Y.

Application May 11, 1950, Serial No. 161,303

23 Claims. (Cl. 33—164)

The present invention relates to micrometers and micrometric measuring instruments, and is more particularly directed to such instruments arranged for direct reading of extremely fine measurements.

The usual micrometer used by machinists and tool makers has a scale or scales which make it possible to read directly to a thousandth of an inch (0.001"), or 0.01 mm., and to estimate the ten thousandths of an inch or 0.005 mm. Such estimating is conventionally accomplished by estimating (guessing at?) the position of the sleeve marking relative to the barrel marking, by the use of vernier, or in some other fashion subject to error.

According to the present invention, measuring instruments of various kinds and suited for various uses may be readily constructed to give a direct thimble-to-barrel reading of 0.0001" or 0.002 mm. without any estimation whatever. No vernier or similar device is relied upon. These objectives are accomplished by producing the instrument with (1) a spindle normally locked against rotation in a fixed barrel but presettable in spaced positions having regular steps (e. g., 0.1") and (2) a thimble sleeve having a differential thread connection with the fixed barrel of the instrument and the non-rotating spindle. The presetting of the spindle is accomplished by releasing the lock, rotating the spindle in the threaded sleeve a complete revolution or a plurality of complete revolutions, after which it is again locked against rotation. The thimble sleeve has a range of movement sufficiently great to propel and repel the spindle through a distance equal to the spacing of successive positions of the spindle, so that in such a range no spindle resetting is necessary. All measurements in the range (e. g., 0.1" to 0.2") are made from one spindle setting without the use of spacers, anvil resetting devices and the like.

In measuring instruments made according to the present invention, the spindle carries external threads at its inner concealed end and the barrel of the instrument is provided with internal threads substantially greater in diameter than those on the spindle and having the differential pitch relation. The threaded end of the spindle is received in a master or differential sleeve also threaded into the barrel. The sleeve carries a thimble adapted to be secured to it in adjusted position and extending along the outside of the barrel.

The micrometer barrel also carries two readily accessible thumb pieces, one for releasing the spindle lock and the other for operating a locking spring which locks the thimble and threaded sleeve against rotation.

The invention also contemplates an improved anvil position indicator whereby it is possible to make certain that the measurement being made is always under a known anvil pressure. It is also possible to employ such mechanism with a manual release for opening and closing the instrument when used as a comparator.

Not only is the invention suitable for embodiment in a hand instrument, but it is also suitable for use in many machines such as jig borers, milling machines, etc., where accurate positioning of parts is of great importance. When so employed one can, with standard distance pieces of precisely known length, set the machine to an accuracy of 0.0001" (or 0.002 mm.) by a direct reading instrument.

Other and further objects will appear as the description proceeds.

The accompanying drawings show, for purposes of illustrating the present invention, four embodiments in which the invention may take form, it being understood that the drawings are illustrative of the invention rather than limiting the same.

In these drawings:

Figure 1 is an enlarged side elevational view of a manually carried and operated micrometer with parts in section in the broken line 1—1 of Figure 2, the parts being adjusted for measuring a work piece 0.1999" thick;

Figure 2 is a section on the line 2—2 of Figure 1 looking to the right;

Figure 3 is an elevational view of the micrometer with the spindle retracted and the thimble sleeve threaded in;

Figure 4 is a sectional view on the line 4—4 of Figure 2;

Figure 5 is an elevational view of a barrel extension sleeve, taken in the direction of the arrow 5, Figure 4;

Figure 6 is a section on the line 6—6 of Figures 4 and 5;

Figure 6a is an enlarged fragmentary section on line 6a, Figure 6;

Figure 6b is a fragmentary section on line 6b of Figure 6a;

Figure 7 is an elevational view of the sleeve of Figure 5 taken from the right;

Figure 8 is a fragmentary elevational view of the spring spreader;

Figure 9 is an elevational view showing the thimble sleeve friction spring detached and taken in the direction of arrow 5 of Figure 4;

Figures 1 to 9, inclusive, show an outside micrometer of generally C-shaped contour. The body or frame of the micrometer, designated generally at 20 has a hollow cylindrical barrel 21 extending to the right in the drawings. It is preferably made of tool steel. This barrel has at the left a smooth relatively small diameter cylindrical bore 22 which opens at the right into a larger diameter bore 23, and this in turn opens into a still larger bore 24 which extends to the extreme end 25 of the barrel. The body is drilled from the right end in the plane of the section of Figure 4 to provide a hole 26 extending nearly to the left face 27 of the barrel. Part of this drilling is cut away by the counterbore 24. Opposite the drilling 26 the barrel has an outwardly opening recess 28 which intersects the drilling.

Figures 1, 2, 3:
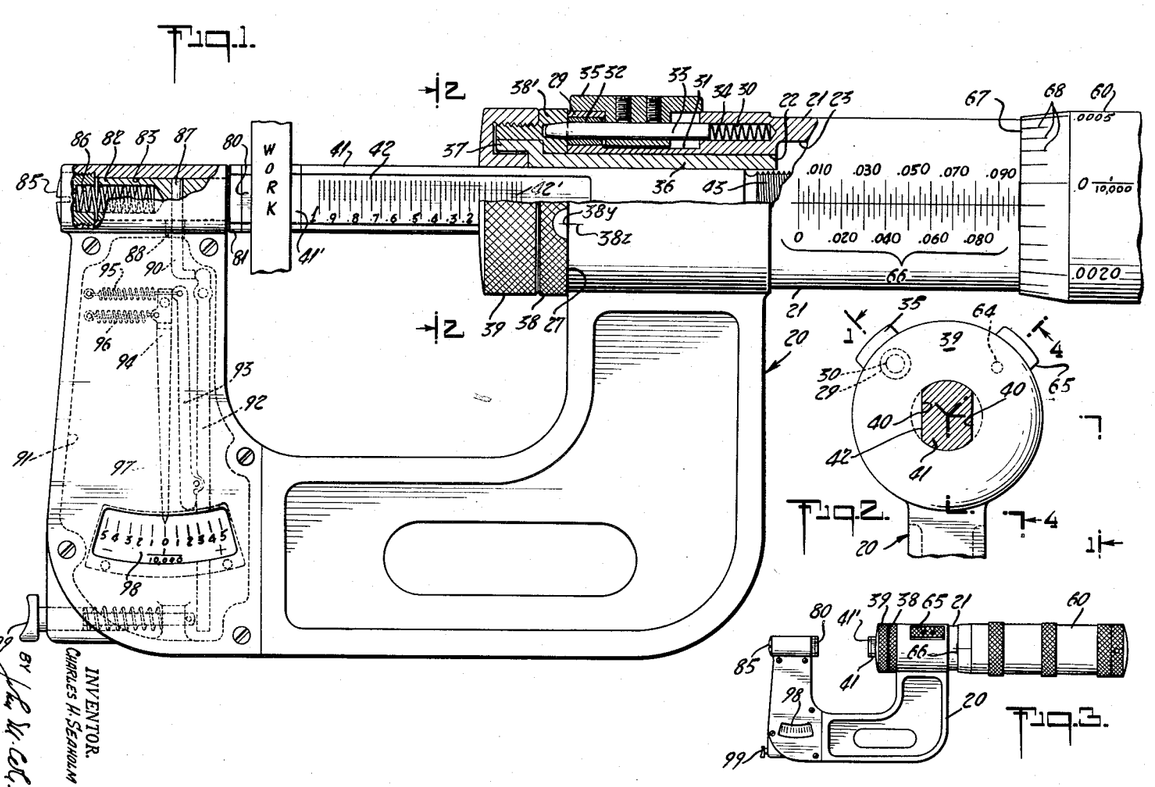
Figures 4, 5, 6, 6A, 6B, 7, 9, 10:
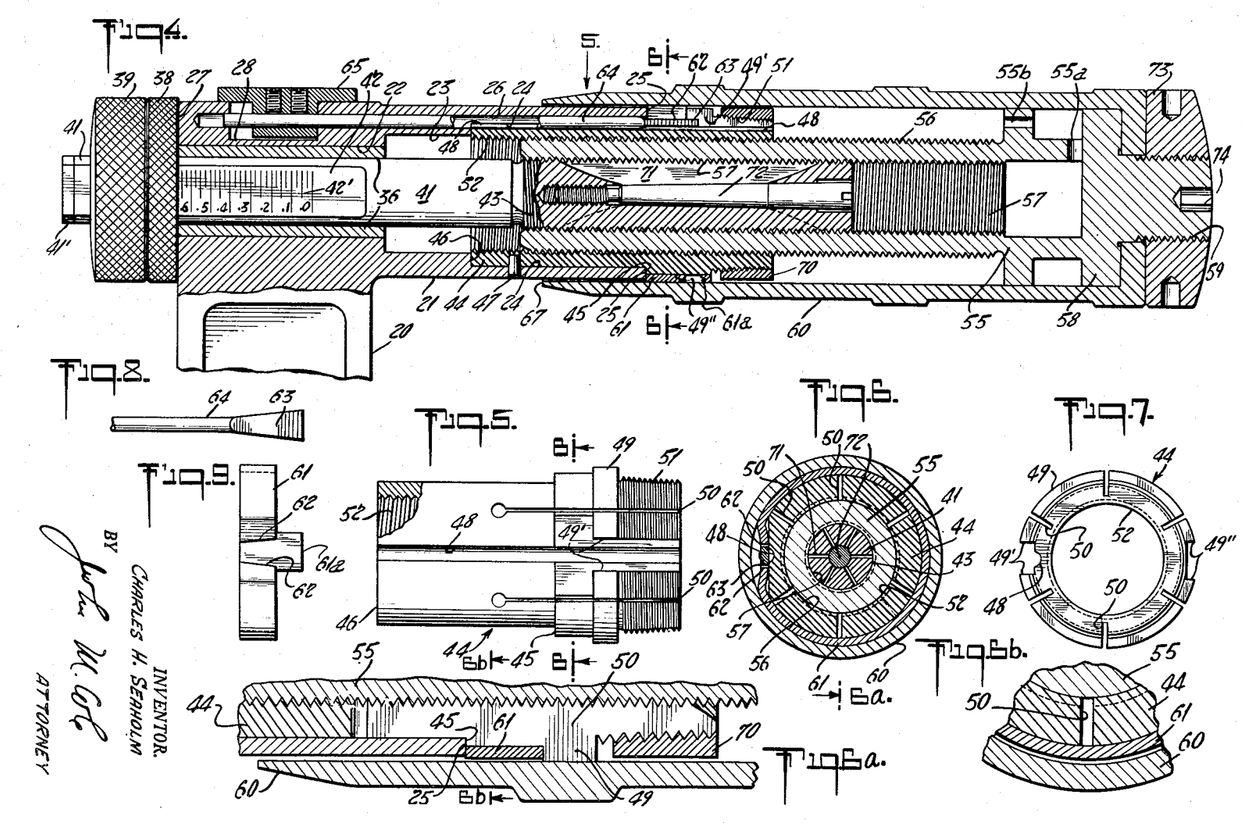

The barrel is also drilled from the left face 27 in the plane of Fig. 1 to provide aligned holes 29 and 30, the latter being of less diameter. A recess 31 intersects the drilling 29, 30. The drilling 29 carries a hardened bushing 32. A hardened pin or rod 33 guided in bushing 32 and hole 30 is protracted by a spring 34 to project beyond the left face of the barrel. The pin or rod 33 may be retracted by a thumb piece 35 to bring the end of the pin into the bushing 32 and behind face 27.

The small diameter bore 22 of the barrel receives a pressed in tool steel bushing 36, expanded as indicated at 37 and carrying a twirling and controlling nut or collar formed of two parts 38 and 39 threaded together. The part 38 has a tapered drilling 38' to receive pin 33 and prevent turning when the pin is protracted. The part 39 has an opening with two parallel guide flats 40, 40.

The nut 39 receives a steel spindle 41 with corresponding flats 42, the front one of which carries indicia 42' (which in the English scale may be in $\frac{1}{10}$, $\frac{1}{20}$ and $\frac{1}{40}$ of an inch, i. e. 0.1", 0.05", 0.025"), these extending to the left of the twirling nut 38, 39. The spindle has a wear resistant tip 41' and its body is rotatably received in the bushing 36. It has a long threaded inner end 43, these threads in the English system ordinarily being 40 threads per inch so that when the spindle 41 is turned by the collar one revolution in a stationary threaded member, the spindle 41 moves one division or 0.025". The collar 38 has a conveniently located registry line 38y coinciding with line 38z on the frame when locking pin 33 is in line with recess 38'.

The counterbore 24 at the right of the barrel 21 receives a sleeve 44 (Figs. 5–7), which in effect provides an extension of the barrel. The sleeve 44 has a light press fit, a shoulder 45 engages the end 25 of the barrel and its end 46 engages the reducing shoulder between bores 23 and 24. It is pinned in place by a taper pin 47. It has a groove at 48 in line with the hole 26. It has a collar 49 spaced from the shoulder 45 and cut away at 49' in line with groove 48 and at 49'' at the opposite side. Sleeve 44 is slitted as shown at 50 and provided with tapered threads 51. The slits preferably do not come all the way to the end of the sleeve at its inner diameter. The sleeve 44 is internally threaded as shown at 52. These threads bear a differential relation to the threads 43 on the spindle and in the English system would be 40×$\frac{10}{11}$ or 36$\frac{4}{11}$ threads per inch.

The male thread 43 on the spindle 41 and the female thread 52 in the barrel extension sleeve 44, receive a master or differential sleeve 55, preferably Phosphor bronze, with male and female threads 56 and 57 cooperative with the same, and at the outer end is provided with a head 58 threaded at 59. Vent holes are drilled at 55a and 55b. An outer sleeve 60 is secured on the master sleeve and extends leftwardly and about the outside of the barrel 21 and extension sleeve 44 so as to cover and protect these parts and make it possible to read the relative angular and longitudinal positions of the sleeve 60 and the barrel 21.

The master or differential sleeve 55 as well as the outer sleeve 60 are kept from turning whenever desired by an arcuate, preferably Phosphor bronze friction spring 61 (Figs. 4, 6 and 9), received in the space between collar 49 and the end 25 of the barrel proper, and when expanded adapted to engage the inner wall of sleeve 60. The mid portion 61a of the spring is received in slot 49'' of sleeve nut 44. The ends of this spring are beveled as indicated at 62 (Fig. 9) and receive the wedge shaped end 63 of a rod or pin 64 which extends through the drilling 26, lengthwise through the recess 28 and through the thumb piece 65 to which it is secured. When this thumb piece is in the position shown in Figure 4, the spring grips sleeve 44 and is, as shown in Figure 6b, out of contact with the thimble, so that it can be turned, but when the thumb piece 65 is shifted to the left, the thimble is gripped and the sleeve 55 locked.

The stationary body of the instrument carries lineally arranged graduations 66 which spread over a distance of 1.1000'', and in the English system "read" 0.0025'', 0.0050'', 0.0075'', 0.0100'', etc., up to 0.100''. The left end of the outer thimble sleeve 60 is tapered to a thin edge as indicated at 67 and carries peripherally arranged graduations, indicated at 68. It takes 40 revolutions of the sleeve 55, 60 to shift the spindle 0.1'' and make the sleeve travel the 1.1000'' distance included between 0.0 and 0.1 on scale 66. The spacing from 0.0000 to 0.0025 on scale 66 is actually 0.0275'' and equals the differential movement produced by one rotation of the thimble sleeve 55, 60, hence it is possible to read each 0.0001'' directly.

The micrometer reading for the setting shown in Figure 1 is obtained by observing that thimble sleeve 60 has been turned beyond the zero line so that 0.0024'' is opposite the center line of scale 66. Thus, 0.0975'', plus the thimble barrel reading of 0.0024'' gives 0.0999''. This, added to the previously established gap of one-tenth of an inch obtained when the spindle was set to span the distance 0.1 to 0.2 on the scale 42', makes the complete reading 0.1999'', which, it will be noted, is accomplished without any estimation, vernier or the like. In practice, the user would read the instrument "zero point one nine seventy-five plus twenty-four or zero one nine-nine-nine."

The threads 52 on the sleeve 44 and 56 on the sleeve 55 are subject to wear. While the parts are replaceable, their useful life may be prolonged by adjusting for wear by means of tapered nut 70 carried on threads 51 on sleeve 44. This nut 70 is accessible when outer sleeve 60 is removed. To make it possible to adjust for the effect of wear in the threads between the spindle 41 and sleeve 55, the spindle 41 is slotted as indicated at 71 and receives a tapered pin 72. To facilitate assembly and provide for final assembly setting and adjustment for anvil and spindle wear, the threaded end 59 of the differential sleeve 55 carries a spanner nut 73 and is provided with a hexagonal hole 74 so that with two wrenches thimble 60 may be angularly adjusted and locked on sleeve 55.

The outside micrometer shown uses right-hand threads, and as a consequence the sequence of numbering progresses from right to left on the flat side of the spindle so as to facilitate reading the same; the calibration of the scale on the micrometer barrel progresses from the zero line near the body of the micrometer outwardly (i. e., from left to right) toward the free end, and a higher reading of the peripheral calibration is obtained on the thimble as the top of the thimble is turned toward the operator.

The construction of the instrument is simple throughout, making for ready assembly and ease of subsequent adjustment to take up any wear of moving parts and measuring surfaces. The twirling and control nut 38, 39 presents relatively large wear-resisting bearing surfaces for holding the measuring spindle 41 against rotation, and can readily be replaced when worn. The feature of two flats for the non-rotative alignment of the measuring or contact spindle makes the manufacture of this part simple and economical and much to be preferred to keyways or splines. As it is desirable to finish-lap this member after imparting a high degree of hardness to the same, it is clearly to be seen that keyways or splines could be held to axial paralellism, smoothness of finish, and interchangeability, only at great expense, would present greater difficulty in cleaning and render arduous the task for readjusting worn areas. Compensation for wear in the spindle and related guiding surfaces is simple, being merely a matter of relapping flat surfaces on the spindle, and replacing the twirling and control nut. The thread of the measuring or contact spindle would be precision ground and the thread lapped after grinding. All other parts should be made with great care and precision.

In Figure 1, the work piece W being measured is between the wear-resistant (tungsten carbide) tip 41' of the spindle 41 and a similar wear-resistant tip 80 on the anvil 81. The anvil has the same flattened section as the spindle so as to improve accessibility in the measurement of shouldered shafts and the like. This anvil has a shank 82 slidably received in a bore 83 in the body 20 and aligned with the bore 22. The end of the bore 83 is closed by a screw 85 firmly seated in place, and a spring 86 between the anvil shank and screw urges the anvil to the right. The anvil carries a pin 87 which extends downwardly through elongated hole 88. The dimensions of the parts are such that the shank 82 is brought against the end of screw 85 before the pin 87 can reach the left face of the hole 88. This serves to avoid applying excessive pressure to the relatively frail pin 87.

When no pressure is applied to the anvil, the spring projects it slightly outward, the pin 87 providing a stop. When contact with the work is made, the thimble must be turned to press the anvil back against the spring.

The lower end 90 of the pin 87 is utilized to actuate an anvil indicator mechanism housed in a recess 91 of the left end of the body or frame of the micrometer. The indicator mechanism includes levers 92, 93 and 94 with springs 95 and 96. The lever 94 carries a pointer 97 movable over a dial 98 calibrated in 0.0001'' from +0.0005'' to —.0005''. The low end of lever 92 is opposite a manually operable plunger 99 by means of which one can shift the anvil away from the work. The movement of the plunger is limited so that no excessive load can be imposed on the indicator or the anvil parts, and provisions should be made in manufacturing the instrument to allow for slight over travel beyond the 0.0005'' scale movements.

When the micrometer is to be used for making a direct measurement, the gap between the anvil and spindle tip is brought to the nearest 0.1'' spacing in excess of the work piece dimension. To do this, the thimble sleeve 60 is locked against rotation by shifting thumb piece 65 to the left.

It will be noted that the locking of the sleeve in any desired position is effected by expansion of the spring 61 against the thimble or sleeve 60 where plenty of surface area is available. When locked, it is practically impossible to inadvertently turn the thimble sleeve. Thumb piece 35 is shifted to the right and the twirling nut turned the requisite number of complete revolutions to position the spindle. Thumb piece 35 is then released and spring 34 pushes plunger rod 33 into the recess 38' so as to lock the spindle against rotation. Spindle sleeve 60 is released and then turned to bring the spindle tip against the work piece and apply pressure through it to the anvil in an amount to bring the pointer 97 to zero. It will be noted that simple pressure is applied with no accompanying twisting or torsional force exerted on the work.

Where the micrometer is to be used as a comparator, the desired spindle setting is made and the thimble locked, after which the manually operable plunger 99 may be used to retract the anvil to receive the piece of unknown dimension. On release of the plunger, the anvil indicator system shifts the anvil against the piece and the indicator shows the difference in dimension, if any.

It will be understood that the thread pitches selected above (40 and 36$\frac{4}{11}$ threads per inch) are by way of example. It is highly satisfactory for a hand tool using the English system. A coarser thread—such as 20 per inch on the spindle—would require for the .0001'' reading that the thimble have 50 graduations instead of the 25 shown. These could readily be placed on the larger sleeve, which such an instrument could well carry. Where the metric system is employed, the threads would have metric pitches of suitable value and corresponding ratio.

Figures 10, 11, 12, 13, 13A, 13B, 14:
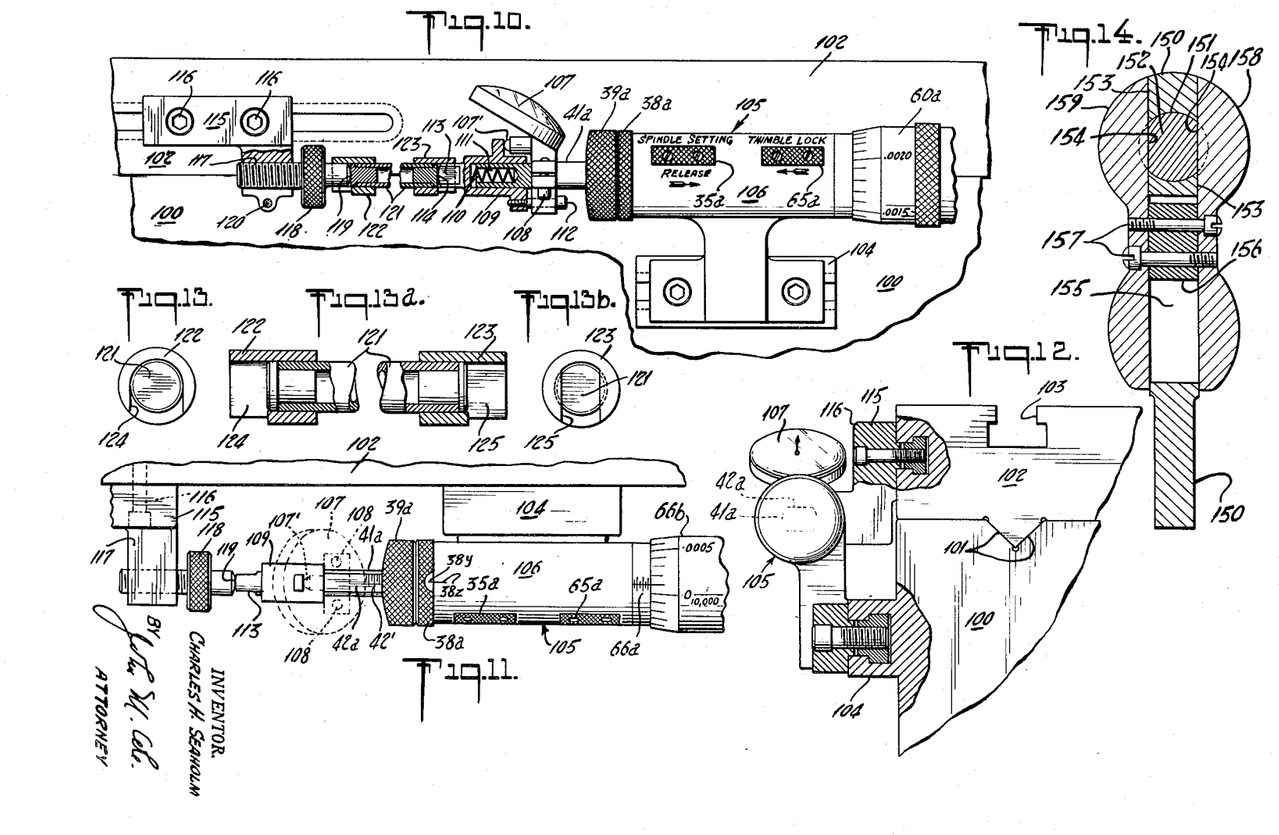
Figures 10, 11 and 12 are fragmentary side elevational, top plan and sectional views of the base and movable table of a jig borer, milling machine or the like with attached micrometer.
Figures 13, 13a, 13b illustrate a measuring rod of standard or known length adapted for use with the micrometer of Figures 10 to 12.
Figure 14 illustrates a further modification.

Figures 10 to 12 indicate at 100 the body of a jig borer, milling machine or other similar machine having a horizontal grooved bed 101 on which rides a movable work table 102 slotted at 103 for the securement of a work piece in place. These figures also show the application to such a machine of a micrometer having many features discussed above in detail and arranging for determining the relative positions of the work table as it is moved along the body of the machine. Inasmuch as horizontal measurements are to be taken and the instrument is usually below eye level, the parts are shown arranged for such work.

Here the body 100 of the machine is shown as having a slotted boss 104 a short distance below the machine bed and the micrometer body 105 is fixedly secured with its axis horizontal, this body is provided with the same functioning parts as the right-hand portion of the body 20 of the form shown in Figures 1–9, and carries the same parts, differently arranged to facilitate their use alongside the machine body.

The body 105 has a longer barrel 106 and the spindle setting thumb piece 35a and thimble locking thumb piece 65a may be aligned near the top of the barrel. The twirling nuts 38a, 39a are arranged to be stopped so that the flats 42a on the spindle 41a are horizontal. The scales 66a and 66b are on top of the barrel 106 and of the thimble 69a. The readings refer to such a scale.

The spindle 41a extends beyond the scale so as to carry a dial indicator 107 secured to it by clamping bolts 108 and a slidable spindle extension 109. The spindle extension is urged to the left by a cushioning spring 110 received in a counterbore 111 in the spindle extension and its movement is limited by bolts 112 which pass through clearance holes in the dial indicator structure. The slidable spindle extension bears against the plunger 107' of the dial indicator and has vertical flats 113 and a contact face 114.

The movable work table 102 of the machine carries an anvil supporting bracket 115 secured in place in any convenient manner, as for example by bolts 116. The bracket has a horizontally threaded bore 117 aligned with the bore of the micrometer body 105 and carries an adjustment screw 118, having an anvil face 119 and adapted to be clamped in place by a constricting screw 120.

The contact faces of the spindle extension and of the anvil are preferably wear resistant. Where the movable table is located so that the distance separating these faces is within the reach of the micrometer, measurement may be made directly (as shown in Fig. 11) without any auxiliary spacers. Where, however, the spacing is greater, standard spacers, made to known lengths may be employed. Such a spacer is indicated in the drawings at 121. To facilitate holding it in place, it carries sleeves 122 and 123 slotted as indicated at 124 and 125 to fit over the anvil member 119 and the flats 113 on the spindle extension 109. The flats 113, 125 prevent any rolling movement of the spacer rod.

In the embodiment of the invention pictured in Figures 10 to 13, the non-rotative spindle carries the pre-set indicator, cooperating with the spindle's pushed-out contact surface. This spindle extension 109 would, like the floating anvil of the micrometer already discussed, require a pushing back of approximately one to two thousandths of an inch in order to exhibit the true reading, disclosed when the indicator hand registers zero. Hence, the projected over-reach of the spring- (or otherwise) cushioned contact end 114 being in this case absorbed into the indicator mechanism as contact is made, the anvil proper, or the abutting end of the rod from which the measure is reckoned, is fixed, i. e., non-cushioned. While the dial indicator 107 is of conventional contour, I do not limit myself to any particular shape or location of the indicator for the attainment of the aim of a double-check reading. The body of this auxiliary registering device may be that of a thin disc, or it may be cylindrical, annular, saddle-shaped, or of any other convenient form; it may also be placed farther back from the contact end of the spindle than shown as long as it truly records, through physical connection, the absorption of the movement of the spindle's cushioned contact end requisite for a double-check of the basic setting of the spindle and the thimble-to-barrel reading of the micrometer. Also, the indicator's registering marker may oscillate over a flat dial, or over a peripheral or truncated conical dial, or it may travel reciprocally-axially.

In this embodiment the range of the instrument's usefulness is extended to the machine tool field proper. By means of selective settings of the contact elements afforded by an appropriately placed T slot system, as shown in Figures 10 to 12, and the use of measuring rods of varying lengths, and the length increment from rod to rod being in agreement with the capacity of the micrometer, the correct gauging of machine tool table movements becomes relatively easy. The adaptation may be made by adding the T slot arrangement to machine tools already in use, such as jig borers, milling machines, precision lathes, etc., or by incorporating in the patterns and castings the features requisite for integrating the instrument with new machine tools being built. It being exceedingly difficult to produce and maintain accurate machine lead screws of considerable length, the invention will be found valuable in the applications referred to, and in many similar applications, since the accurate length of each spacer rod is readily attainable. Tipping the ends of the rods with wear resistant material such as tungsten carbide, or the like, will insure continued precision and dependability of these members. The linear extent of the T slot scheme being suited to the machine of fixture to which it is applied, and the spacer rod increments being commensurate with the range of the micrometer spindle, it follows that any setting within the limits of the machine's table travel, or limit of tool travel, may be had with ease and exactness.

It is apparent that the devices shown in Figures 10–13 may also be used generally in machines where measurements of great accuracy are to be made whether lengthwise of the machine bed, crosswise of it, or vertically, the parts being mounted in optimum positions for use.

In Figure 14, the body 150 of the micrometer has a cylindrical bore 151 which receives the spindle 152 similar to the spindle of Figures 1–11. The body has flattened sides 153, 153 which intersect the bore. They are spaced the same as the flattened sides 154 of the spindle so that the spindle sides are exposed. The body has a slot 155 below the bore. A spacer 156 is received in this slot and is secured by screws 157 to jaws 158, 159 which engage the side faces of the body. When the jaws are in the position shown in the drawing, the spindle is held against rotation, but can be moved by the thimble sleeve as above described. When the jaws are lowered, the spindle is free for rotation and adjustment as above described. This spindle lock may be used instead of the twirling nut.

Since it is obvious that the invention may be embodied in other forms and constructions within the scope of the claims, I wish it to be understood that the particular forms shown are but two of these forms, and various modifications and changes being possible, I do not otherwise limit myself in any way with respect thereto.

What is claimed is:

1. A micrometer having a tubular body provided at its inner end with a fixed sleeve forming a spindle bearing, with cylindrical bearing surface and a flanged extension spaced from the body; a spindle slidably and rotatably mounted in the bearing, two collars threaded together and rotatable about the flange, one collar having a non-circular opening and the spindle having a non-circular portion fitting the non-circular opening, the spindle being threaded at its remote or outer end and carrying on its protruding end indicia spaced according to the pitch of the threads on the outer end, the outer end of the body being internally threaded at a pitch different from that of the spindle threads; a thimble sleeve threaded into the body and onto the spindle so that lengthwise movement of the thimble sleeve and the locked spindle have a ratio corresponding to the thread pitch ratios, cooperable fixed and rotatable spindle locking means which when in unlocked position permits rotation of the spindle and longitudinal adjustment thereof in the thimble cylinder threads and when locked holds the spindle in a selected angular position, and a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body.

2. A micrometer as claimed in claim 1, wherein the ratio of the differential threads on the sleeve is such that a multiple integral number of revolutions of the thimble sleeve and thimble effects the same movement of the spindle as one revolution of the spindle whereby the thimble-body indicia cover a range equal to that of one revolution of the spindle.

3. A micrometer as claimed in claim 1, wherein the spindle has Y threads per unit of length and the body has $$Y \text{ times } \frac{m}{n}$$

threads per unit length, $m$ and $n$ being whole numbers and $m$ less than $n$.

4. A micrometer as claimed in claim 1 wherein the spindle and thimble sleeve have 40 threads per inch and the spindle has graduations spaced .0250″ and the body and thimble sleeve have $36\frac{4}{11}$ threads per inch, the longitudinal thimble sleeve-to-body indicia being spaced .0250″ × 1/10 or .0275″ for each revolution of the thimble sleeve, the cylindrically disposed indicia on the thimble sleeve being spaced evenly to permit reading fractional parts of a revolution.

5. A micrometer as claimed in claim 1 wherein the tubular body is made in two parts, one part being counterbored to receive the reduced end of the other part, the parts being pinned together to prevent relative movement, the part having the reduced end carrying the threads which receive the thimble sleeve.

6. A micrometer as claimed in claim 1, wherein the spindle is slitted along an intermediate portion of the threads, and having a tapered pin engageable with the spindle between the slits to expand the spindle and compensate for wear.

7. A micrometer as claimed in claim 1, wherein the threaded end of the spindle has a counterbore with a tapered portion leading to a threaded portion and is slitted opposite the tapered portion, and having a screw threaded into the counterbore and having a tapered shank to fit the tapered counterbore, whereby the spindle may be expanded to compensate for wear.

8. A micrometer having a stationary barrel internally threaded at its outer end and having a cylindrical bore at the inner end, a thimble sleeve externally threaded to fit in the outer end of the barrel, protruding beyond the barrel and extending about the outer end of the barrel and provided with internal threads of differential pitch, a thimble carried by the thimble sleeve, a spindle bearing sleeve secured in the bore, a spindle having its outer end threaded into the threaded sleeve and its inner end carried in the spindle bearing sleeve and protruding beyond it, the inner end of the spindle having a flattened side providing an elongated indicia bearing area, a spindle twirling device rotatably and nonremovably carried by the inner end of the bearing sleeve and engaging the flattened side of the spindle so that when the spindle is rotated by the twirling device the spindle is shifted lengthwise, means to lock the twirling device in one angular position only to fix the angular position of the spindle; the spindle side having indicia spaced according to the pitch of the spindle threads, the end of the thimble carrying circumferentially arranged indicia, the barrel carrying longitudinally extending indicia past which the end of the thimble moves, said latter mentioned indicia having a spacial relationship relative to those on the spindle corresponding with the differential relation of the threads.

9. In a micrometer, a spindle threaded at one end and having a flat side at the other end, a body carrying a threaded spindle receiving member adapted to be held stationary or turned on its axis and a spindle bearing member in which the spindle is freely rotatable and longitudinally movable, a collar revolvably carried by the spindle bearing member, a second collar threaded to the first and through which the flat sided end of the spindle extends, the second collar having a correspondingly shaped opening so that the collars when turned about the spindle axis turn the spindle and shift it in the threaded spindle receiving member, and means to lock the collars against rotation so that the spindle may be locked against rotary movement without interfering with its longitudinal movement when the threaded spindle receiving member is turned.

10. In a micrometer, as claimed in claim 9, wherein the locking means includes a spring protracted, manually retractable plunger carried by the body, and a recess in the first threaded ring to receive the protracted plunger.

11. In a micrometer, a body; a thimble threadedly supported from the body for rotation about the body and movement along the body; and a thimble lock including a body-carried, normally contracted, split, annular spring, and a body carried, slidable wedge between the ends of the spring; and a means to shift the wedge back and forth.

12. In a micrometer, a body having an annular spring receiving channel near its outer end, a split annular spring received in the channel and locked opposite the split against rotation, a longitudinally extending, body carried rod having a wedge-shaped spring expander between the ends of the spring; a thimble sleeve threadedly carried by the body, a thimble secured to the sleeve and extending outside the body and opposite the spring; the spring when contracted being free of the thimble and when expanded frictionally engaging the body.

13. In a micrometer, a body having a spindle bearing at one end and counterbored at a larger diameter at the other end, an internally threaded extension sleeve fitted into the counterbored end and non-rotatably secured therein, the extension sleeve having a shoulder spaced from the end of the body to provide annular space, the shoulder being cut away at two opposite places, an annular contractible spring having an anchorage lug on one shoulder cut out and free ends aligned with the other cut out, a longitudinally extending drilling in the extension sleeve and body in line with the ends of the spring, a rod slidably carried in the drilling and having a wedge-shaped end between the spring ends for expanding the spring to grip a thimble, and a thimble about the extension sleeve and body and threadedly supported from the extension sleeve.

14. In a micrometer, a thimble sleeve having internal threads adapted to carry a spindle and external threads of different pitch adapted to be received in a micrometer body, the thimble sleeve having a closed end provided with a collar, a reducing shoulder and a threaded boss, a thimble slidably received by the collar and having a flange fitting against the reducing shoulder, and a nut threaded on the boss and bearing against the flange on the thimble.

15. A micrometer having a tubular body provided at its inner end with a spindle bearing, a spindle slidably and rotatably mounted in the bearing including a cylindrical bore with two cut-away portions, the spindle having a non-circular portion and being threaded at its remote or outer end and carrying on its protruding end indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle locking means which when in unlocked position permits rotation of the spindle and longitudinal adjustment thereof in the thimble cylinder threads when locked holds the spindle in a selected angular position, a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body, and a pair of slidable jaws in said cut-away portions of the spindle and shiftable from a position where they engage the spindle to prevent rotation to a position where they are free of the spindle so that it may be rotated.

16. A micrometer having a tubular body provided at its inner end with a spindle bearing, a spindle slidably and rotatably mounted in the bearing, the spindle being threaded at its remote or outer end and having a flat sided protruding end carrying indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle side engageable, spindle locking means which when in unlocked position permits rotation of the spindle and longitudinal adjustment thereof in the thimble cylinder threads and when locked holds the spindle in a selected angular position, and a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body.

17. A micrometer having a tubular body provided at its inner end with a spindle bearing, a spindle slidably and rotatably mounted in the bearing, the spindle being threaded at its remote or outer end and carrying on its protruding end indicia spaced according to the pitch of the threads on the outer end, the outer end of the body being internally threaded at a pitch different from that of spindle threads, a thimble sleeve threaded into the body and onto the spindle so that lengthwise movement of the thimble sleeve and the locked spindle have a ratio corresponding to thread pitch ratios, cooperable fixed and rotatable spindle locking means including a longitudinally slidable plunger and a revolvable nut provided with a stop engageable with the plunger and having a fixed angular relation with the spindle, said locking means acting when in unlocked position to permit rotation of the spindle and longitudinal adjustment thereof in the thimble cylinder threads and when in locked position to hold the spindle in a selected angular position, and a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body.

18. A micrometer having a tubular body provided at its inner end with a spindle bearing, a spindle slidably and rotatably mounted in the bearing, the spindle being threaded at its remote or outer end and carrying on its protruding end indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle locking means which when in unlocked position permits rotation of the spindle and longitudinal adjustment thereof in the thimble cylinder threads and when locked holds the spindle in a selected angular position, a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body, and means to lock the thimble and the thimble sleeve against rotation so that the spindle may be turned in the bearing and thimble sleeve threads.

19. A micrometer having a tubular body provided at its inner end with a spindle bearing, a spindle slidably and rotatably mounted in the bearing, the spindle being threaded at its remote or outer end and carrying on its protruding end indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle locking means which when in unlocked position permits rotation of the spindle and longitudinal adjustment thereof in the thimble cylinder threads and when locked holds the spindle in a selected angular position, a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body, a normally contracted spring carried by the body inside the thimble sleeve, and cam means for expanding the spring to cause it to grip the thimble and prevent turning of the thimble and thimble sleeve.

20. A micrometer having a tubular body provided at its inner end with a spindle bearing, a spindle slidably and rotatably mounted in the bearing, the spindle being threaded at its remote or outer end and carrying on its protruding end indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle locking means which when in unlocked position permits rotation of the spindle and longitudinal adjustment thereof in the thimble cylinder threads and when locked holds the spindle in a selected angular position, a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body, a longitudinally reciprocable, body-carried rod with an externally accessible thumb piece and a wedge shaped cam near the outer end of the body, and a normally contracted spring carried by the body inside the thimble and engageable by the wedge shaped cam to be expanded thereby against the inner surface of the thimble sleeve.

21. A micrometer having a tubular body made of two parts threaded together and provided at its inner end with a spindle bearing, a spindle slidably and rotatably mounted in the bearing, the spindle being threaded at its remote or outer end and carrying on its protruding end indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle locking means which when in unlocked position permits rotation of the spindle and longitudinal adjustment thereof in the thimble cylinder threads and when locked holds the spindle in a selected angular position, a thimble carried by the thimble sleeve and extending inwardly about the outer end of the body, a normally contracted spring inside the thimble and non-rotatably carried by the threaded body part, the body and thimble sleeve having cooperative indicia readable in accordance with the longitudinal and angular positions of the thimble and in conjunction with the indicia on the spindle indicating the position of the spindle relative to the micrometer body, the two body parts being longitudinally drilled, a slidable spring expander in the drilling, and a thumb piece for actuating the spring expander back and forth to lock or unlock the thimble.

22. A micrometer having a tubular body provided at its inner end with a spindle bearing, a spindle slidably and rotatably mounted in the bearing, the spindle being threaded at its remote or outer end and carrying on its protruding end indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle locking means which when in unlocked position permits rotation of the spindle and longitudinal adjustment thereof in the thimble cylinder threads and when locked holds the spindle in a selected angular position, a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body, the thimble sleeve having a closed outer end with a reducing shoulder and protruding threaded boss, the thimble having an inwardly flanged outer end bearing against the shoulder on the thimble sleeve, and a nut threaded on the boss for securing the thimble and thimble sleeve together.

23. A micrometer having a tubular body provided at its inner end with a spindle bearing, a spindle slidably and rotatably mounted in the bearing, the spindle being threaded at its remote or outer end and carrying on its protruding end indicia spaced according to the pitch of the threads on the outer end, the outer end of the body being internally threaded at a pitch different from that of the spindle threads, a thimble sleeve threaded into the body and onto the spindle so that lengthwise movement of the thimble sleeve and the locked spindle have a ratio corresponding to thread pitch ratios, cooperable fixed and rotatable spindle locking means including a longitudinally slidable plunger and a revolvable nut provided with a stop engageable with the plunger and having a fixed angular relation with the spindle, and acting when in unlocked position to permit rotation of the spindle and longitudinal adjustment thereof in the thimble cylinder threads and when in locked position to hold the spindle in a selected angular position, a thimble carried by the thimble sleeve and extending inwardly about the outer end of the body, the body and thimble sleeve having cooperative indicia readable in accordance with the longitudinal and angular positions of the thimble and in conjunction with the indicia on the spindle indicating the position of the spindle relative to the micrometer body, and means to lock the thimble and thimble sleeve against rotation so that the spindle may be turned in the bearing and thimble sleeve, the thimble locking means being angularly displaced from the spindle locking plunger.

References Cited in the file of this patent

UNITED STATES PATENTS

| Number | Name | Date |
|---|---|---|
| 626,876 | Spalding et al. | June 13, 1899 |
| 679,779 | Pierpont | Aug. 6, 1901 |
| 928,889 | Starrett | July 20, 1909 |
| 1,133,652 | May | Mar. 30, 1915 |
| 2,441,317 | Gribble | May 11, 1948 |
| 2,467,499 | Sachtleber | Apr. 19, 1949 |
| 2,521,825 | Brown | Sept. 12, 1950 |

FOREIGN PATENTS

| Number | Country | Date |
|---|---|---|
| 5,080 | Great Britain | 1900 |
| 8,798 | Great Britain | 1906 |
| 405,217 | Germany | Oct. 31, 1924 |
| 597,656 | Great Britain | Jan. 30, 1948 |